US007002534B2

(12) United States Patent
Park

(10) Patent No.: US 7,002,534 B2
(45) Date of Patent: Feb. 21, 2006

(54) SEE-AROUND TYPE HEAD MOUNTED DISPLAY DEVICE

(75) Inventor: Tae Soo Park, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 227 days.

(21) Appl. No.: 10/214,112

(22) Filed: Aug. 8, 2002

(65) Prior Publication Data

US 2003/0030596 A1 Feb. 13, 2003

(30) Foreign Application Priority Data

Aug. 8, 2001 (KR) .............................. 2001-47747

(51) Int. Cl.
*G09G 5/00* (2006.01)

(52) U.S. Cl. ............................. 345/8; 345/9; 348/115; 349/11; 359/13

(58) Field of Classification Search ................ 345/7–9; 348/115; 349/11; 359/13
See application file for complete search history.

(56) References Cited

U.S. PATENT DOCUMENTS

| | | | | | |
|---|---|---|---|---|---|
| 5,875,056 | A * | 2/1999 | Takahashi | ................... | 359/633 |
| 5,991,103 | A * | 11/1999 | Togino | ....................... | 359/834 |
| 6,219,188 | B1 * | 4/2001 | Tsukamoto | ................. | 359/629 |
| 6,400,341 | B1 * | 6/2002 | Maeda et al. | .................. | 345/8 |
| 6,429,954 | B1 * | 8/2002 | Kasai | .......................... | 359/13 |
| 6,671,099 | B1 * | 12/2003 | Nagata | ....................... | 359/629 |
| 6,829,113 | B1 * | 12/2004 | Togino | ....................... | 359/834 |
| 2001/0009478 | A1 * | 7/2001 | Yamazaki et al. | .......... | 359/630 |

OTHER PUBLICATIONS

Institute for Telecommunication Sciences, Definition: Critical Angle, Aug. 23, 1996, http://www.its.bldrdoc.gov/fs-1037/dir009/_1322.htm.*

* cited by examiner

*Primary Examiner*—Henry N. Tran
(74) *Attorney, Agent, or Firm*—Birch, Stewart, Kolasch & Birch, LLP

(57) ABSTRACT

A see-around type head mounted display device is disclosed, which includes a display panel displaying an image restored from an image record medium, and tilted bar prism optics (TBPO) internally reflecting the light emitted from the display panel in total, and generating an enlarged virtual image in front of an observer.

9 Claims, 5 Drawing Sheets

SEE-AROUND TYPE HEAD MOUNTED DISPLAY DEVICE

This application claims the benefit of the Korean Application No. P2001-47747 filed on Aug. 8, 2001, which is hereby incorporated by reference.

BACKGROUND OF THE INVENTION

1. Field of the Invention

The present invention relates to a personal display device, and more particularly, to a head mounted display (HMD) device worn on the head of an observer, which enables a three-dimensional image to be displayed.

2. Discussion of the Related Art

Recently, a demand for personal display devices has been increased with a tendency to a small-sized display device. For this reason, a display device has been developed, in which an image emitted from the small-sized display device is enlarged by optics, so that a virtual image is displayed. At this time, an observer can feel himself watching the image on a large-sized screen at a predetermined distance.

The aforementioned personal display device is called as a head mounted display (HMD) device since the display device is generally worn on the head of the observer in the same manner of wearing eyeglasses.

FIG. 1 is a view showing a related art head mounted display device using a spherical lens.

Referring to FIG. 1, the related art head mounted display device includes a liquid crystal panel (LCD panel) 11, a backlight 12, a half mirror 13 and a spherical mirror 14.

At this time, the liquid crystal panel 11 displays an image restored from an image record medium (not shown). Also, the backlight 12 is formed at the rear of the liquid crystal panel 11, and emits light toward the liquid crystal panel 11. Then, the half mirror 13 changes a light path including the image when the light pass through the liquid crystal panel 11, and the reflective spherical mirror 14 changes the light reflected from the half mirror 13 to the parallel light, so that the observer can see the image.

FIG. 1 shows only one set for directing the image to one eye of the observer. That is, a pair of sets is required to direct the image to both eyes of the observer.

An operation of the head mounted display device will be explained in brief.

First, the light emitted from the backlight 12 is directed to the liquid crystal panel 11. At this time, the light includes image information during passing through the liquid crystal panel 11. Then, the light including the image information is firstly reflected on the half mirror 13 to the reflective spherical mirror 14. Subsequently, the light incident on the reflective spherical mirror 14 is secondly reflected to the half mirror 13, and the light passing through the half mirror 13 is received on the eye of the observer, thereby generating the virtual image on the eye of the observer.

FIG. 2 is a view showing a related art head mounted display device using right-angled bar prism optics (RBPO).

Referring to FIG. 2, the related art head mounted display device includes a liquid crystal panel 21 and right-angled bar prism optics (RBPO) 23. Also, the RBPO 23 includes a bar type prism 23*a* and an eyepiece lens 23*b*.

At this time, a tilted surface 23*c* is formed at the bottom of the prism 23*a* at an angle of 45 degree, and a coating film is formed on the tilted surface 23*c* to totally reflect the light. Then, the eyepiece lens 23*b* is formed to be opposite to the tilted surface 23*c*.

Accordingly, the image from the liquid crystal panel 21 is totally reflected on the tilted surface 23*c* of the RBPO 23, and then is directed to the eye of the observer, thereby generating the virtual image 1 in front of the observer through the eyepiece lens 23*b*.

However, the related art head mounted display device has the following problems.

In the head mounted display device shown in FIG. 1, the observer's field of vision is restricted by the reflective spherical mirror 14, so that the observer feels himself watching the virtual image 1 floating in a dark cave. Accordingly, the observer complained that the virtual image was displayed in a smaller size than a designed size.

Also, in the head mounted device shown in FIG. 1, the half mirror 13 is a semi-transmissive mirror. That is, the half mirror 13 has the problem in that the light emitted from the liquid crystal panel 11 is used about ¾ or less. The light emitted from the liquid crystal panel 11 is firstly lost in the half mirror 133 at a percentage of 50, and the light emitted from the spherical mirror is secondly lost during passing through the half mirror 13 at a percentage of 50. Accordingly, the light incident on the eye of the observer is about 25% or less.

In the head mounted display device shown in FIG. 2, an unusual reflection is generated in the RBPO 23, thereby generating a second virtual image 2. That is, some of the light emitted from the liquid crystal panel 11 is not incident on the tilted surface 23*c*, but is incident on a side of the RBPO 23. At this time, the light incident on the side of the RBPO 23 is unusually reflected to the eye of the observer, so that the observer is confused due to the unnecessary second virtual image 2.

In the head mounted display device shown in FIG. 1 and FIG. 2, the centroid of the device is distant from the face of the observer, so that the device easily slides down, thereby reducing a wearing comfort.

In a case of the head mounted display device shown in FIG. 1, there is a limitation in decreasing a width (d1) of the optics due to structure of the half mirror 13 and the spherical mirror 14.

Also, in a case of the head mounted display device shown in FIG. 2, there is a limitation in decreasing a width (d2) of the RBPO 23 since the RBPO 23 has to have a predetermined thickness for directing the light emitted from the display panel 21 to the tilted surface 23*c*. Accordingly, the centroid of the device is distant from the face of the observer, so that the device slides down on the face of the observer.

SUMMARY OF THE INVENTION

Accordingly, the present invention is directed to a head mounted display device that substantially obviates one or more problems due to limitations and disadvantages of the related art.

An object of the present invention is to provide to a head mounted display device in which a virtual image is displayed with an environmental view, so that an observer can feel himself watching the image in a large-sized screen, thereby obtaining an effect of the large-sized screen such as a theater.

Another object of the present invention is to provide to a head mounted display device for improving efficiency in using light.

Another object of the present invention is to provide to a head mounted display device in which it is possible to prevent an unnecessary virtual image from being generated.

Another object of the present invention is to provide to a head mounted display device for improving a wearing comfort by thinning the head mounted display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head mounted display device according to the present invention includes a display panel displaying an image restored from an image record medium, and tilted bar prism optics (TBPO) internally reflecting the light emitted from the display panel in total, and generating an enlarged virtual image in front of an observer.

At this time, the TBPO includes a bar type prism having two tilted surfaces and a total internal reflection surface, reflecting light emitted from the display panel to an eye of an observer through the total internal reflection surface, and an eyepiece lens opposing the total internal reflection surface of the prism so as to display an enlarged virtual image in front of the observer.

Also, an air space is formed between the total internal reflection surface and the eyepiece lens of the prism so as to internally reflect the light in total.

Also, the prism includes a first tilted surface opposing the eyepiece lens and reflecting the light reflected from the total internal reflection surface to the eye of the observer, and a second tilted surface opposing the display panel, and controlling an incident angle of the light for being incident the light emitted from the display panel on the total internal reflection surface.

At this time, the second tilted surface has a tilted angle for guiding the light emitted from the display panel to the total internal reflection surface, and the first tilted surface has a tilted angle for preventing the enlarged virtual image from being deteriorated.

At this time, the prism is formed of transparent material such as glass or plastic.

Accordingly, the observer can watch the image with the environmental view through the TBPO formed of phototransmissive material, so that it is possible to compare the displayed virtual image with the environmental view, thereby obtaining an effect of large-sized screen.

Also, the light emitted from the display panel is internally and totally reflected in the TBPO, and then is directed to the eye of the observer. Accordingly, it is possible to prevent the light from being lost, thereby improving light-efficiency, and preventing an unnecessary second virtual image from being generated.

Furthermore, the head mounted display device according to the present invention is formed in a small size by thinning with the TBPO according to the present invention, so that the centroid of the display device is near to the face of the observer, thereby preventing the display device from sliding down on the face of the observer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
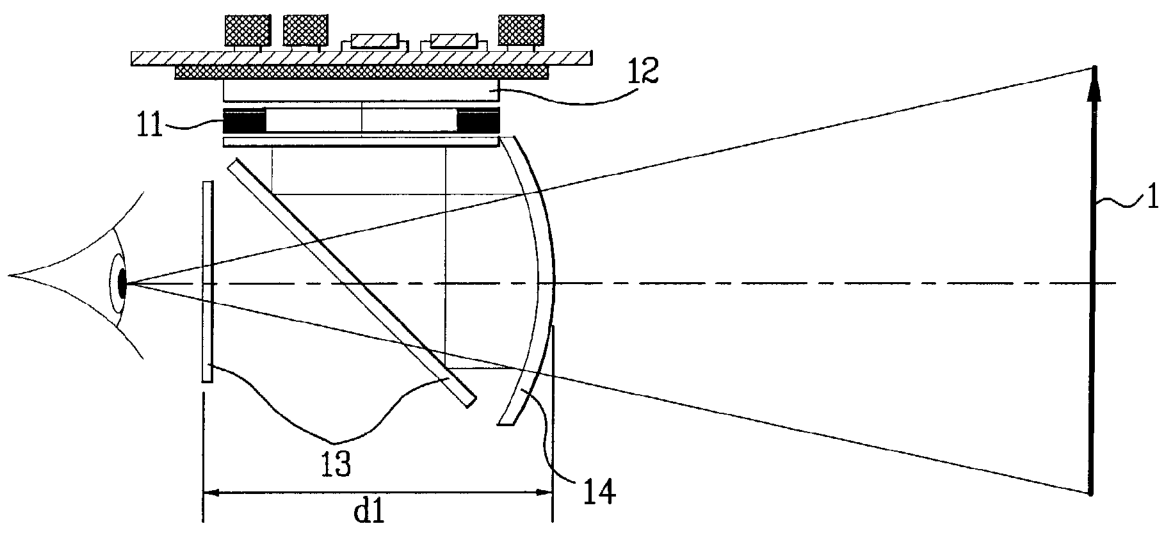
FIG. 1 is a view showing a related art head mounted display device using a spherical mirror.
Figure 2:
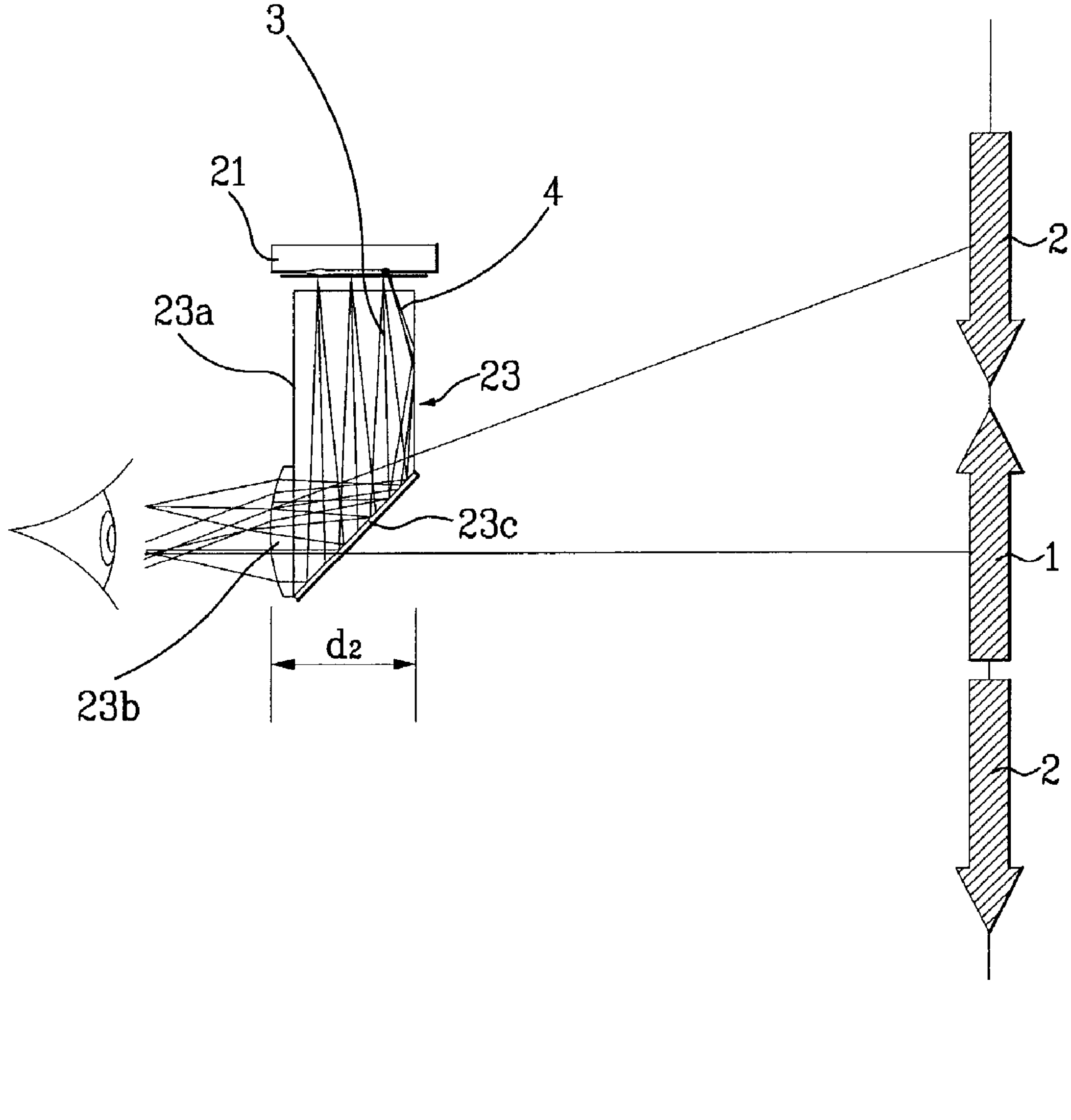
FIG. 2 is a view showing a related art head mounted display device using right-angled bar prism optics (RBPO)
Figure 3:
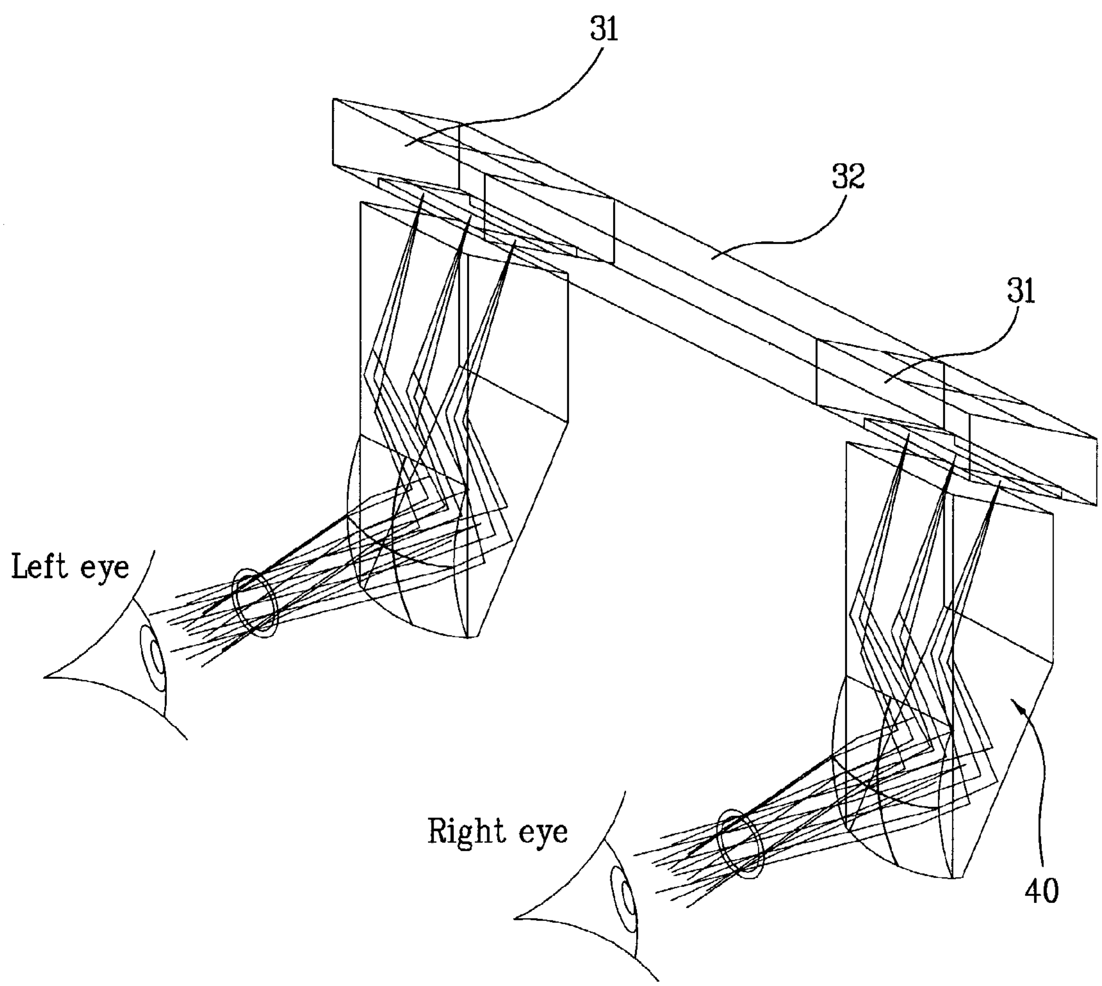
FIG. 3 is a view showing a head mounted display device according to the present invention.

FIG. 3 is a view showing a head mounted display device according to the present invention.

Referring to FIG. 3, the head mounted display device according to the present invention includes a pair of display panels 31, a signal processor 32 and a pair of tilted bar prism optics (TBPO) 40.

At this time, the pair of display panels 31 respectively corresponds to left and right eyes of an observer. Also, the signal processor 32 processes signals applied to the display panels 31. Then, the pair of TBPO internally reflects light emitted from the display panel 31 in total, and displays an enlarged virtual image in front of the observer.

The display panel 31 such as an LCD panel or an EL panel displays an image restored from an image record medium.

In the head mounted display device according to the present invention, the principle for displaying the image of the display panel 31 as the enlarged virtual image will be explained as follows.

Figure 4:
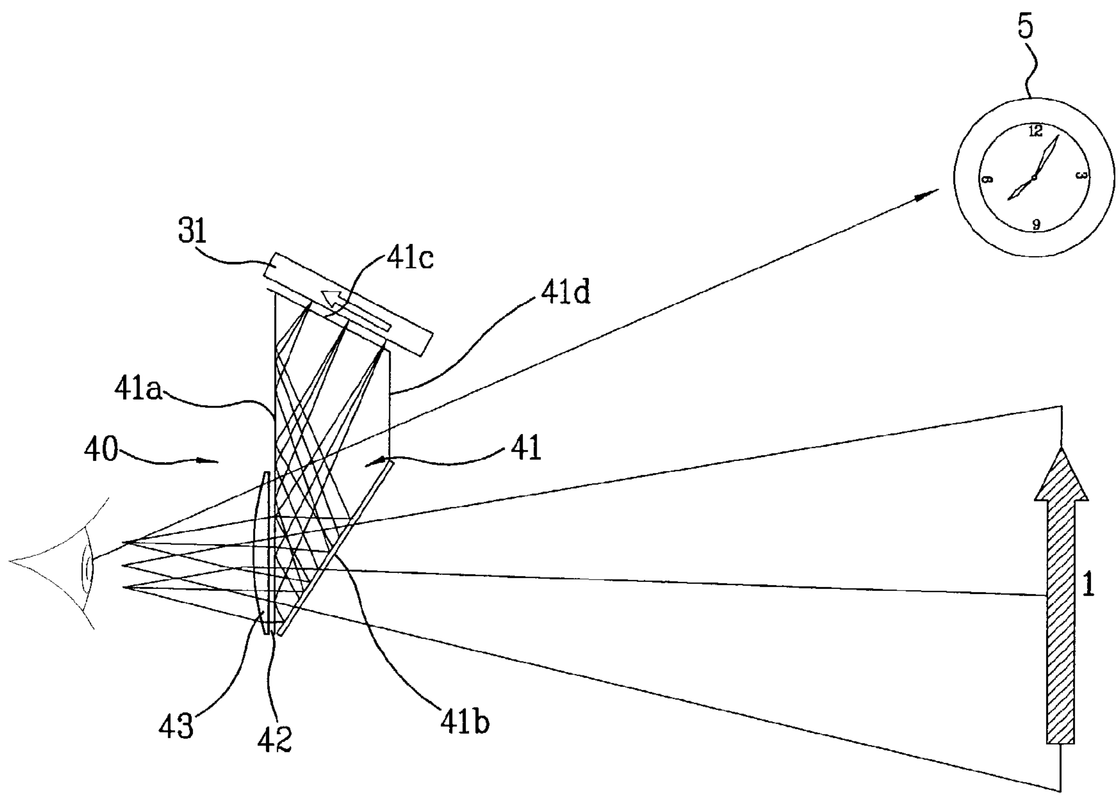
FIG. 4 is a view explaining a see-around effect in a head mounted display device according to the present invention.
Figure 5:
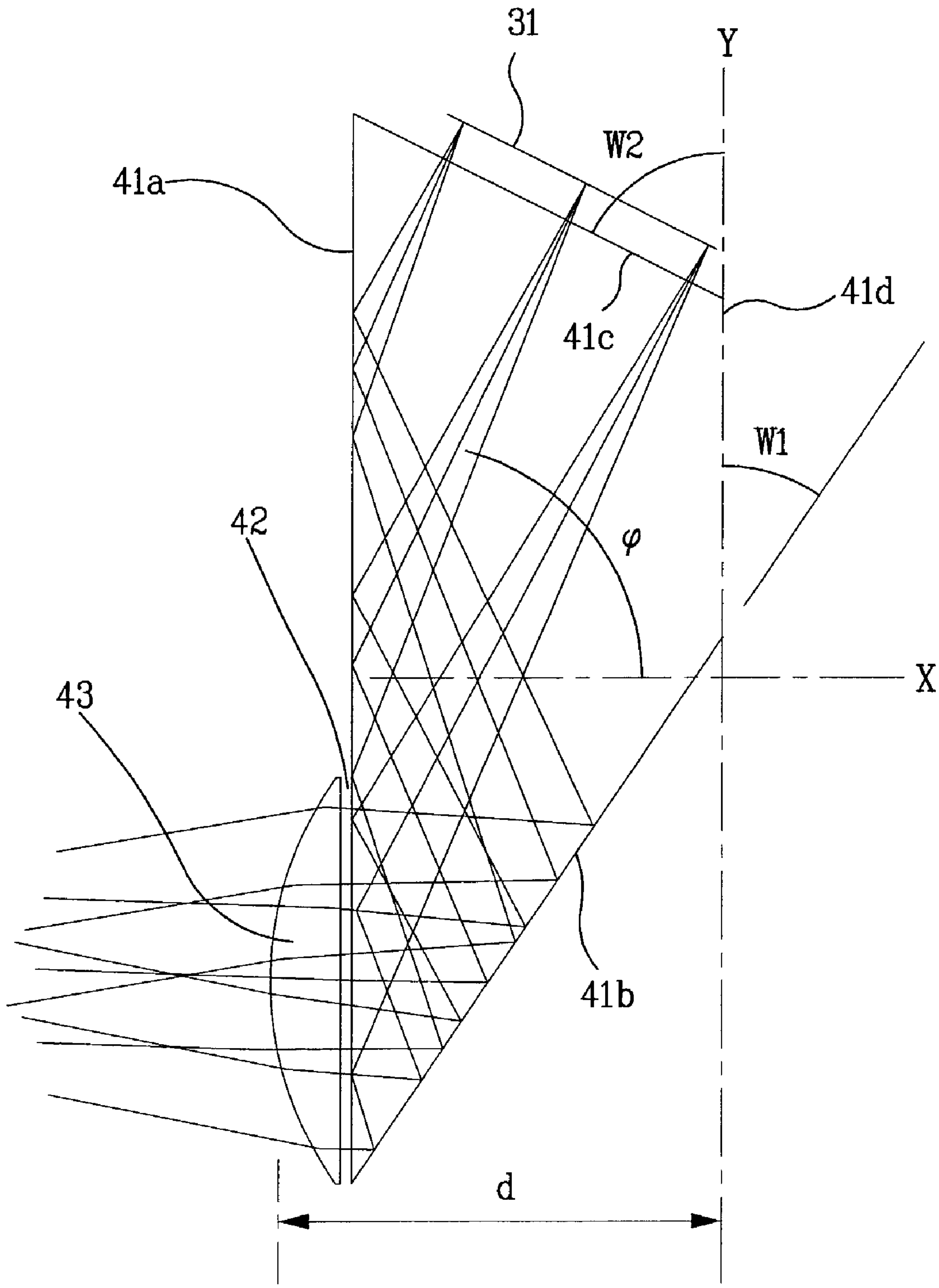
FIG. 5 is a view explaining a structure of tilted bar prism optics (TBPO) and a process step for guiding light by total internal reflection.

FIG. 4 is a view explaining a see-around effect in the head mounted display device according to the present invention. FIG. 5 is a view explaining a structure of tilted bar prism optics (TBPO) and a process step for guiding light by total internal reflection in the head mounted display device according to the present invention.

As shown in FIG. 4, the TBPO 40 includes a prism 41 and an eyepiece lens 43.

At this time, the prism 41 internally and totally reflects light including the image of the display panel 31 in order to direct the light to the eye of the observer, and the eyepiece lens displays the enlarged virtual image in front of the eye of the observer.

The prism 41 is formed in a bar shape, and has lower and upper tilted surfaces 41*c*, 41*b*. Also, a total internal reflection surface 41*a* is formed between the lower and upper tilted surfaces. At this time, the lower tilted surface is called as a first tilted surface 41*b*, and the upper tilted surface is called as a second tilted surface 41*c*.

The total internal reflection surface 41$a$ totally reflects the light incident through the second tilted surface 41$c$ to the first tilted surface 41$b$. Then, the first tilted surface 41$b$ being opposite to the eyepiece lens 43 again reflects the light totally reflected through the total internal reflection surface 41$a$ to the eye of the observer.

The eyepiece lens 43 is formed in front of the total internal reflection surface 41$a$ of the prism 41. At this time, an air space is formed between the eyepiece lens 43 and the total internal reflection surface 41 at a predetermined thickness to totally reflect the light on an entire surface of the total internal reflection surface 41$a$. In other words, the condition of the total internal reflection is determined by refractivity of two materials contacting with each other, so that an entire surface of the total internal reflection surface 41$a$ is contacted with same material so as to equally reflect the light in total.

At this time, the second tilted surface 41$c$ has a predetermined tilted angle for totally directing the light emitted from the display panel 31 to the total internal reflection surface 41$a$. Also, the first tilted surface 41$b$ has a predetermined tilted angle for preventing an unnecessary second virtual image from being displayed, as shown in FIG. 5.

Referring to FIG. 5, X-axis and Y-axis are formed as standard axes. At this time, the Y-axis is parallel with the total internal reflection surface 41$a$, and the X-axis is perpendicular to the Y-axis. Then, tilted angles W1, W2 of the first and second tilted surfaces 41$b$ and 41$c$ are tilted to the Y-axis, so that the tilted angles W1, W2 are tilted to the total internal reflection surface 41$a$.

At this time, the light emitted from the display panel is refracted by the second tilted surface 41$c$, and then is incident on the total internal reflection surface 41$a$. That is, the tilted angle W2 of the second tilted surface is very important element for the total internal reflection.

If an incident angle of the light is referred as 'Ψ', and a refractivity of the prism 41 is referred as 'n', an following equation has to be satisfied so as to internally reflect the light in total.

$$\mathrm{Sin}^{-1} n < \Psi \qquad \text{equation 1}$$

At this time, the incident angle of the light is an angle to the X-axis. Also, a following equation relating to the tilted angles W1, W2 of the first and second tilted surfaces 41$b$, 41$c$ has to be satisfied in order to prevent the enlarged virtual image from being deteriorated.

$$W1 = W2/2 \qquad \text{equation 2}$$

When the tilted angle W1 of the first tilted surface is half of the tilted angle W2 of the second tilted surface, an unnecessary virtual image is not generated, and the enlarged virtual image is not deteriorated.

Preferably, the prism 41 is formed of transparent material, so that the observer can watch environmental things through the prism 41. At this time, the prism may be formed of glass or transparent plastic.

As shown in FIG. 4, the observer can watch the virtual image 1 enlarged by the eyepiece lens 43 with the environmental things through the total internal reflection surface 41$a$ and a back 41$d$ of the prism 41. At this time, the observer can recognize the size of the virtual image by comparing the virtual image with the environmental things of which sizes are familiar to us in our surroundings.

Accordingly, the observer can compare the virtual image with the environmental things to recognize the size of the virtual image 1, thereby obtaining an effect of a large-sized screen, called as a see-around effect.

Preferably, a refractive spherical surface of the eyepiece lens 43 is symmetrically-formed to an optical axis to easily fabricate the eyepiece lens. Also, a refractive spherical surface of the second tilted surface 41$c$ is symmetrical to the optical axis to improve an enlargement ratio of the virtual image, so that an optical aberration is decreased, thereby improving quality of the device.

An operation of the head mounted display device according to the present invention will be explained as follows.

First, the light emitted from the display panel 31 is incident on the prism 41. At this time, the light pass through the second tilted surface 41$c$, and is directed to the total internal reflection surface 41$a$. Subsequently, the light is totally reflected on the total internal reflection surface so as to direct the light to the first tilted surface 41$b$. At this time, the light can be perfectly reflected without an unusual reflection according to the condition of the first and second tilted surfaces 41$b$ and 41$c$.

After that, the light totally reflected from the first tilted surface 41$b$ is directed to the eye of the observer, so that the enlarged virtual image is displayed through the eyepiece lens 43.

As mentioned above, the head mounted display device according to the present invention has the following advantages.

First, the observer can watch the environmental view through the TBPO 40, so that the observer can compare the virtual image with the environmental view, thereby obtaining an effect of the large-sized screen such as a theater.

Also, the light emitted from the display panel 31 internally and totally reflected on the TBPO 40 so as to be directed to the eye of the observer without waste of the light, thereby improving light-efficiency and preventing the second virtual image from being generated.

Furthermore, it is possible to thin the head mounted display device by the TBPO 40. That is, the light is totally reflected by the TBPO 40, so that the light path is overlapped, thereby decreasing the thickness d of the optics. Additionally, the TBPO according to the present invention is different from a related art RBPO in that the TBPO according to the present invention includes the second tilted surface 41 that is useful in decreasing the thickness d of the optics. Accordingly, it is possible to fabricate the small-sized display device. Also, the centroid of the display device is near to the face of the observer, so that it is possible to prevent the display device from sliding on the face, thereby improving the wearing comfort.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A head mounted display device comprising:

a display panel displaying an image restored from an image record medium;

a bar type prism having a first flat tilted surface, a second flat tilted surface, and a flat total internal reflection surface, the bar type prism reflecting light emitted from the display panel to an eye of an observer through the flat total internal reflection surface, the first flat tilted surface totally reflecting the light reflected from the flat total internal reflection surface to the eye of the observer through the flat total internal reflection surface; and an eyepiece lens opposing the flat total internal reflection surface of the prism without inclination so as to display an enlarged virtual image in front of the observer.

2. The head mounted display device as claimed in claim 1, wherein an air space is formed between the flat total internal reflection surface and the eyepiece lens.

3. The head mounted display device as claimed in claim 1, wherein the first flat tilted surface opposes the eyepiece lens, and the second flat tilted surface opposes the display panel, and controls an incident angle of the light for being incident the light emitted from the display panel on the flat total internal reflection surface.

4. The head mounted display device as claimed in claim 3, wherein the second flat tilted surface has a tilted angle W2 to the flat total internal reflection surface, for being satisfied in an equation, $\sin^{-1}n<\Psi$, with referring refractivity of the prism as 'n', and the incident angle of the light 'Ψ'.

5. The head mounted display device as claimed in claim 4, wherein the first flat tilted surface has a tilted angle W1 to the flat total internal reflection surface which is determined by satisfying an equation, W1=W2/2, so as to prevent an enlarged image from being deteriorated.

6. The head mounted display device as claimed in claim 1, wherein the prism is formed of transparent material.

7. The head mounted display device as claimed in claim 6, wherein the prism is formed of glass or plastic.

8. A head mounted display device comprising:

a pair of display panels respectively correspondent to the left and right eyes of an observer;

a signal processor controlling a signal applied to the display panel;

a bar type prism having a first flat tilted surface, a second flat tilted surface, and a flat total internal reflection surface, the bar type prism reflecting light emitted from the display panel to an eye of an observer through the flat total internal reflection surface, the first flat tilted surface totally reflecting the light reflected from the flat total internal reflection surface to the eye of the observer through the flat total internal reflection surface; and an eyepiece lens opposing the flat total internal reflection surface of the prism without inclination so as to display an enlarged virtual image in front of the observer.

9. The head mounted display as claimed in claim 8, wherein an air space is formed between the flat total internal reflection surface and the eyepiece lens.

* * * * *